United States Patent Office 3,586,705
Patented June 22, 1971

3,586,705
OXIDATION RETARDERS
William J. Owen, Penarth, Glamorgan, and Bryan E. Cooper, Cefn Glas, Bridgend, Glamorgan, Wales, assignors to Midland Silicones Limited, Reading, England
No Drawing. Filed Aug. 15, 1968, Ser. No. 752,790
Claims priority, application Great Britain, Aug. 17, 1967, 38,006/67
Int. Cl. C07f 7/02
U.S. Cl. 260—448.2B
8 Claims

ABSTRACT OF THE DISCLOSURE

Novel phenolic compounds of the formula

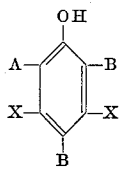

where A is an organosilicon substituent bonded to the ring through a carbon bridge, X is alkyl or alkaryl, and B is A or X, are prepared employing Mg to bond the organosilicon groups to chloroalkyl groups on the ring. The compounds are useful as oxidation retarders.

---

This invention relates to novel compounds which may be employed as additives to oxidizable compositions to retard the oxidation thereof.

It is known that certain 2,4,6-trialkylphenols possess useful oxidation retarding properties. However, the effectiveness of these materials decreases markedly when they are employed at temperatures above 150° C. and, partly for this reason, substances such as phenothiazine are preferred as antioxidants for many purposes, for example in lubricating oils. Phenothiazine, however, has the disadvantage where lubricants are concerned, that it is associated with undesirable sludge formation.

We have now discovered certain novel, substituted phenolic compounds which retard oxidation of organic or organosilicon compositions. At least some of these substituted phenolic compounds produce a degree of retardation comparable to phenothiazine but with reduced sludge formation.

Accordingly, this invention provides novel phenolic compounds having the general formula

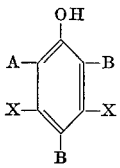

wherein A is an organosilyl residue or an organosiloxane residue in which a silicon atom is connected to the benzene nucleus through a bridging carbon atom, each B is either A or X, provided that not more than one B is hydrogen, and each X represents an alkyl radical, an aralkyl radical, a substituted alkyl radical, a substituted aralkyl radical, or a hydrogen atom.

In the general formula, A represents an organosilyl or an organosiloxane residue which is connected to the benzene nucleus by way of a carbon atom which is connected to a silicon atom in the residue and which is also connected to the benzene nucleus. The substituent A can therefore be an organosilyl residue of the type

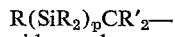
R(SiR$_2$)$_p$CR'$_2$— or an organosiloxy residue such as

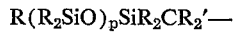
R(R$_2$SiO)$_p$SiR$_2$CR$_2$'— wherein $p$ is an integer, R is an organic radical and R' is a hydrogen atom or an alkyl radical, for example a methyl, ethyl, propyl, butyl, octyl and octadecyl radical. R can be an organic radical, for example an alkyl radical such as methyl, ethyl, propyl, nonyl and octadecyl; an alkenyl radical such as vinyl and allyl; an aryl radical such as phenyl or a substituted hydrocarbon radical such as the aminoalkyl, alkoxyalkyl, fluoroalkyl and chlorophenyl radicals. In the preferred compounds of this invention, R represents the methyl or phenyl radicals, R' is a hydrogen atom and $p$ has the value of 1.

Each substituent B in the general formula of the compounds of this invention can be an organosilyl residue or an organosiloxane residue as defined for A. Additionally, B can also represent an alkyl radical such as the methyl, ethyl, t-butyl and octadecyl radicals. The B groups can be the same or they can be different.

In the general formula, X can represent a hydrogen atom in the benzene nucleus or it can represent an alkyl or substituted alkyl radical present as a substituent in the nucleus. The substituent X can, therefore, represent radicals such as methyl, ethyl, propyl, butyl, and methoxymethyl radicals. Preferably, however, X represents a hydrogen atom.

Examples of the novel compounds within the scope of this invention are thus:

(I) 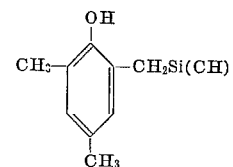

(II) 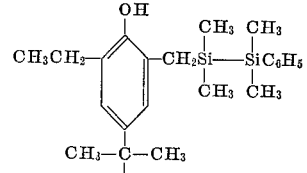

(III) 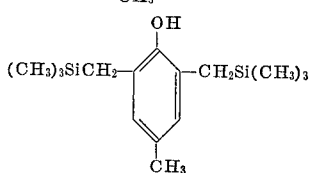

(IV) 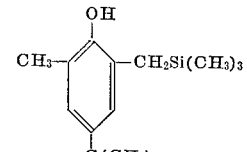

(V) 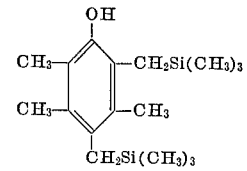

(VI) 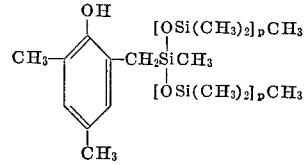

wherein $p$ is an integer.

The invention further provides an oxidizable organic or organosilicon composition having therein as an oxidation retarder a compound according to our invention.

Preferably, the oxidizable composition is a lubricant fluid, e.g. a mineral oil or a synthetic lubricant such as an organopolysiloxane fluid, a dicarboxylic ester (e.g. dioctyl sebacate, dilauryl adipate, dihexyl azeleate), a phosphate ester (e.g. tricresyl phosphate) or a polyester or polyglycol fluid, or a cutting fluid such as ethylene glycol, glycerol and aqueous emulsions of mineral oils, light paraffin oils or fatty esters. The oxidation retarders of our invention can also be used with vegetable oils, filled greases, transformer oils, hydraulic fluids, paints, varnishes, lacquers, organopolysiloxane elastomers, polyurethanes, polyesters, polyvinyl chloride, natural rubber, polyacetals, polyamides, epoxy resins, phenol formaldehyde resins, melamine resins, polymethyl methacrylate, or any oxidizable organic or organosilicon composition. Preferably, the oxidation retarder is present in a proportion of from 0.1 to 10% by weight, e.g. 0.2 to 2%.

The compounds of this invention can be prepared by the reaction in the presence of magnesium of a phenolic compound having substituted therein a halomethyl group, with an organosilicon compound containing a silicon bonded halogen atom. This invention, therefore, further provides a process for the preparation of novel phenolic compounds which comprises reacting in the presence of magnesium (1) a compound of the formula

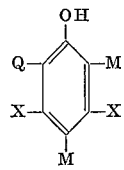

wherein Q represents a halomethyl group, X is as hereinbefore defined and each M is Q or X provided that not more than one M is hydrogen with (2) an organosilicon compound containing at least one silicon-bonded halogen atom.

Preferably, the compound (1) employed in the process contains one or two halomethyl radicals and remaining substituents in the benzene nucleus being lower alkyl radicals, for example the methyl or tertiary butyl radicals. Preferably, also the halomethyl radical is chloromethyl.

The preferred reactants (1), therefore, are

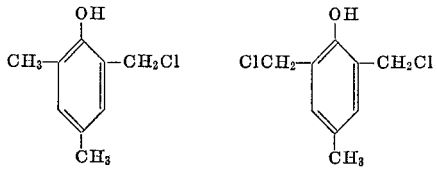

The organosilicon compound (2) employed in the process of the invention can be a halosilane, a halopolysilane, a halogenated siloxane or a halogenated polysiloxane. Preferred are the silanes, particularly the more readily available lower alkyl chlorosilanes such as trimethylchlorosilane.

Preferably, the reaction is carried out in the presence of a polar non-protonating solvent, e.g. tetrahydrofuran. Conveniently, the reactant (1) is added slowly to a mixture of halosilane and magnesium in the solvent.

The reaction is exothermic and the temperature of the mixture is preferably maintained below 30° C., by cooling if necessary. Preferably, the reaction mixture is refluxed after the addition of the reagent, until the reaction is complete. Desirably, water is added when the reaction is complete and the organic phase is then separated and dried. When the reactant (1) contains more than one halomethyl substituent, the reaction normally provides a mixture of products. This mixture can, if desired, be fractionated to separate the individual components, or alternatively the mixture can in some instances be employed as an oxidation retarder without further separation. It has been found that the mixture of products obtained by the process of this invention contains, in addition to the desired end-products, low molecular weight polymeric materials which are not readily definable. These materials, from which a dimeric compound such as

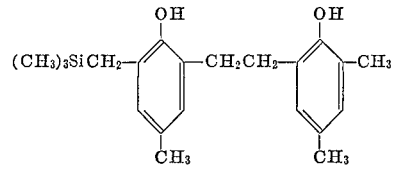

has been separated and identified, have also been found useful as oxidation retarding additives and their use as such is accordingly included within the scope of this invention.

Preferably, an excess of the halosilane is employed in the process of the invention. The magnesium is normally present in a proportion of 1 gm. atom/gm. atom of halogen introduced with the reactant (1).

The invention includes products prepared by the method of the invention which contain residual unreacted halogen, e.g.

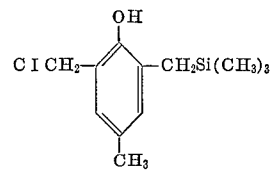

The invention is illustrated by the following examples wherein Me represents a methyl ($CH_3$) radical.

EXAMPLE 1

A saturated solution of 2,6-bis(chloromethyl)-4-methylphenol (41 g., 0.2 mole) in tetrahydrofuran was added to magnesium (14.4 g., 0.6 g. atom) and trimethylchlorosilane (108.5 g., 1 mole) in tetrahydrofuran (400 ml.). There was an exothermic reaction and the mixture was kept at below 30° C. by cooling. The solution was added over 2 hours and the resulting mixture refluxed for a further 2 hours. Water was added and the dried organic extract fractionated to give:

Product I B.P. 78°/0.6 mm. (4.8 g.). Found C, 68.9%; H, 9.67%; Si, 13.18%. $C_{12}H_2OSi$ requires C, 69.2%; H, 9.62%; Si, 13.5%. Structure was confirmed by infrared and n.m.r. spectra as:

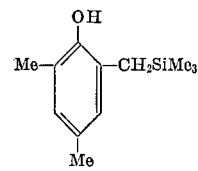

Product II B.P. 93°/0.6 mm. (1.2 g.). Found C, 64.2%; H, 9.71%. $C_{15}H_{28}OSi_2$ requires C, 64.3%; H, 9.65%. The structure was confirmed by infrared and n.m.r. spectra as:

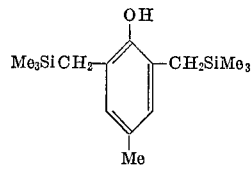

Product III B.P. 120–150°/0.6 mm. infrared and n.m.r. shows presence of $Me_3Si$—$CH_2$— and phenolic OH groups.

Each of these products acts as an oxidation retarder in organic compositions.

EXAMPLE 2

Results of antioxidant tests in di(2-ethyl-hexyl) adipate at 220° C.

The test consists of blowing air through the heated oil, containing 0.5% of the additive, for 6 hours and measuring the viscosity of the cold (25° C). oil before and after oxidation. The results are expressed as the percentage increase in viscosity. The additives were compared with standard anti-oxidants (phenothiazine, phenyl naphthylamine (PANA) and 2,tert.butyl-4,6-dimethylphenol) and the oil with no additive.

| | Additive 0.5% | Percent viscosity increase |
|---|---|---|
| | Blank | 85 |
| H-N (phenothiazine structure) | Phenothiazine | 11 |
| NHPh-naphthyl | PANA | 17 |
| OH, Me, Me, Me, Me (2,tert.butyl-4,6-dimethylphenol structure) | 2,tert.butyl-4,6-dimethylphenol | 53 |
| OH, Me, CH₂SiMe₃, Me (2,trimethylsilylmethyl-4,6-dimethylphenol structure) | 2,trimethylsilylmethyl-4,6-dimethylphenol | 12 |
| | Product III | 7 |

The anti-oxidant efficiency was determined by the method of Bichel and Kooyman J.C.S. (1956) 2215. Product I had an A.E. of 330 and Product II of 190 compared with 175 for t-butyldimethylphenol.

Product I was found to have an induction period of 6.2 hours in cumene at 60° C. under air at atmosphere pressure; t-butyldimethylphenol had an induction period of 5.2 hours under the same conditions, That which is claimed is:
1. A compound of the formula

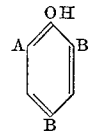

where A is a trihydrocarbylsilylmethyl group having less than 19 carbon atoms; having a silicon atom attached to the benzene ring through an alkylene group, and B is a hydrogen atom, an alkyl radical having less than 18 carbon atoms or a trihydrocarbylsilylmethyl group having less than 19 carbon atoms.

2. A compound according to claim 1 wherein one B is an A group and the other B is hydrogen or an alkyl group.

3. A compound according to claim 1 wherein each B is an alkyl group.

4. 2-(trimethylsilylmethyl)-4,6-dimethylphenol.

5. 2,6-bis(trimethylsilylmethyl)-4-methylphenol.

6. A method of preparing a compound according to claim 1 which comprises reacting in the presence of magnesium a compound of the formula

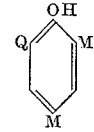

wherein Q represents a halomethyl group, and each M is Q, an alkyl radical of less than 19 carbon atoms, or a hydrogen atom, provided not more than one M is a hydrogen atom and a trihydrocarbylsilyl chloride or bromide having less than 19 carbon atoms.

7. Method according to claim 6 wherein Q is a chloromethyl group.

8. Method according to claim 7 wherein the reaction is effected in a polar non-protonating solvent.

References Cited

UNITED STATES PATENTS

| | | | |
|---|---|---|---|
| 2,611,777 | 9/1952 | Speier | 260—448.2(B) |
| 2,711,417 | 6/1955 | Frisch | 260—448.2(B) |
| 3,137,720 | 6/1964 | Cooper | 260—448.2(B) |
| 3,328,450 | 6/1967 | Plueddemann | 260—448.2UX |
| 3,410,820 | 11/1968 | Harrod | 260—448.2X |

OTHER REFERENCES

Bazant et al., "Organosilicon Compounds," vol. 1, Academic Press, Inc., N.Y. (1965), pp. 180–186.

JAMES E. POER, Primary Examiner

P. F. SHAVER, Assistant Examiner

U.S. CL. X.R.

252—400; 260—448.2E